United States Patent [19]
Schroeder

[11] Patent Number: 5,188,193
[45] Date of Patent: Feb. 23, 1993

[54] DRIVE ARRANGEMENT FOR EARTH MOVING MACHINES

[75] Inventor: Klaus Schroeder, Kirchdorf/Iller, Fed. Rep. of Germany

[73] Assignee: Liebherr-Werk Bischofshofen Ges.m.b.H., Bischofshofen, Austria

[21] Appl. No.: 739,793

[22] Filed: Aug. 1, 1991

Related U.S. Application Data

[63] Continuation of Ser. No. 504,319, Apr. 3, 1990, abandoned.

[30] Foreign Application Priority Data

Apr. 3, 1989 [DE] Fed. Rep. of Germany ....... 3910748

[51] Int. Cl.$^5$ .................... B60K 17/06; B60K 17/356; E02F 9/20
[52] U.S. Cl. .................... 180/242; 180/243; 180/305
[58] Field of Search ............... 180/233, 242, 243, 244, 180/245, 246, 294, 374, 375, 377, 378, 379, 380, 382, 383, 385, 305

[56] References Cited

U.S. PATENT DOCUMENTS

2,125,163  7/1938  Hacker et al. ................... 180/242
3,447,619  6/1969  Nodwell et al. ................. 180/243
3,521,719  7/1970  Forpahl.

FOREIGN PATENT DOCUMENTS

3632416  4/1988  Fed. Rep. of Germany.
 494140  9/1970  Switzerland.
2028737  3/1980  United Kingdom.

Primary Examiner—Mitchell J. Hill
Attorney, Agent, or Firm—Morgan & Finnegan

[57] ABSTRACT

A drive arrangement for earth moving machines of simplified structure which allows ready access to the various parts thereof for servicing. The arrangement includes a controlled hydrostatic motor dispersed between a fluid power pump associated with the internal combustion engine of the machine and which is connected through its drive shaft to the universal drive shaft of the machine at a point between the rear wheel driving axle and the universal joint associated therewith.

14 Claims, 3 Drawing Sheets

DRIVE ARRANGEMENT FOR EARTH MOVING MACHINES

This is a continuation of co-pending application Ser. No. 07/504,319, filed on Apr. 3, 1990, now abandoned.

This invention relates to a drive arrangement for earth moving machines, especially wheel loaders, comprising two drive axles provided with differentials which are connected through a universal joint shaft and which machines are provided with an internal combustion engine driving a pump which, in turn, drives the universal joint shaft via a variable displacement motor, preferably a swash plate motor.

BACKGROUND OF THE INVENTION

Conventional drive arrangements for two-axle earth moving machines comprise a diesel engine which is connected via a hydrodynamic torque converter with the input shaft of a gear box, whose output shaft is connected via spur gearing with the universal joint shaft as a driving connection. Drive systems of this type not only have an unfavorable draft, that is, load or load-pulling capacity, characteristic but also due to rigid coupling of the internal combustion engine, which is usually a diesel engine, via the hydrodynamic converter, the gear box and the spur gearing, to the universal joint shaft is elaborate and disadvantageous.

Certain improvements in drive arrangements of the type in question are possible, provided the internal combustion engine is connected through a hydraulic pump which drives a hydrostatic motor whose power may be controlled and whose output shaft is arranged to drive the universal joint shaft via a gear box. Such a drive system is not only more adaptable due to the connection of the hydraulic pump with the hydrostatic motor using a hydraulic hose or hoses, but, it also makes it possible to use a hydrostatic drive arrangement and, as well, provide a closer approach to the ideal curve of the draft function, that is to say the draft as a function of speed.

It is an object of the invention to provide a drive arrangement of the initially described type having a simplified structure and which is adaptable to requirements arising in use in an advantageous manner.

It is still a further object of the invention to provide a drive arrangement of the initially described type which exhibits ready accessibility for servicing.

BRIEF STATEMENT OF THE INVENTION

In accordance with the invention and to achieve the above-mentioned objects, there is provided a drive arrangement for an earth moving machine having front and rear wheels, a brake system, a steering system, an internal combustion engine having a fluid power pump associated therewith which is driven by the engine, and which is provided with front and rear wheel driving axles provided with differentials having universal joints which are connected together by a universal joint shaft, the engine being arranged to drive the universal joint shaft through a controlled hydrostatic motor having a drive shaft and which is connected to the pump and to the universal joint shaft at a point between the rear wheel driving axle and the respective universal joint associated therewith.

Still further in achieving the above-mentioned objects, as well as advantages resulting therefrom in accordance with the invention, the hydrostatic motor is arranged to drive the universal joint shaft at a point between the differential of the rear axle and the universal joint. Consequently, there is no need to provide an additional gear box and the draft and speed are directly controlled through the variable displacement hydrostatic motor. In view of the elimination of an additional gear box, a drive arrangement according to the invention, is suitable for earth moving machines, such as wheel loaders with low speeds of travel of up to about 20 km per hour, the drive arrangement being a particularly simple structure exhibiting ready accessibility to the various units thereof for servicing and the like.

The hydrostatic motor is preferably a swash plate motor or pump disposed as an axial piston motor.

The shaft of the hydrostatic motor or, respectively, of the swash plate motor or pump is conveniently constituted by the universal joint shaft itself, thus providing a favorable and compact manner of construction.

In accordance with another feature of the invention, the hydrostatic motor is arranged to serve as a reserve pump for the brake system and/or the steering system. Thus, if the engine or the hydraulic pump driven thereby should fail, the control system may be operated so that the hydrostatic motor functions as a reserve or standby pump making it possible for the brakes and the steering, as well, to still be supplied with hydraulic fluid, as long as the wheels of the earth moving machine are turning.

It is also within the purview of this invention to provide a drive arrangement in which a hydrostatic motor is flange-mounted directly on the housing of the differential of the rear wheel axle so as to protrude to the rear and which motor drives the crown wheel of the differential via a bevel wheel.

In such an arrangement, the hydrostatic motor may be the only drive motor for the universal joint shaft or it may be provided in addition to a first motor driving the universal joint shaft.

It is further within the purview of this invention to provide hydrostatic motors on both sides of the differential of the rear axle to drive the universal joint shaft. In such an arrangement, the two motors may be simultaneously supplied with hydraulic fluid by the hydraulic pump driven by the internal combustion engine so that, given a suitable control system for the two hydrostatic motors, it is possible to ensure a high thrust at a low speed of travel. Conversely, if the input rate of the front hydrostatic motor is set to zero so that the entire pump power is used for driving the rear hydrostatic motor, the speed of travel may be increased with a reduction in the thrust force. In such an arrangement where the two hydrostatic motors drive the universal joint shaft via the rear differential, the thrust force and the speed of the travel can be varied over a wide range without having any mechanical gear box.

In such drive arrangements, it is preferred and convenient that the rear hydrostatic motor be a swash plate motor which is configured as well to operate as a reserve pump for the brake and/or the steering system.

In accordance with a particularly advantageous feature of this invention for earth moving machines provided with a major power capacity, a gear box is flange-mounted on the differential housing of the rear wheel axle so that the output shaft of the gear box drives the crown wheel of the differential via a bevel gear wheel and a hydrostatic motor is provided which is flange-mounted on the rear end of the gear box and is arranged to drive the input shaft thereof. In this arrangement as well, it is convenient to provide a further hydrostatic motor to drive the universal joint shaft at a point between the differential of the rear axle and the universal joint. In such modifications, the front hydrostatic motor may be used as well to supplement the thrust force or, after suitable switching over, to function as a reserve pump for the brake and/or steering system. It is again advantageous in such arrangements that the hydrostatic motor is a swash plate motor, whose power may be conveniently controlled.

The use of a hydrostatic drive arrangement according to the invention offers the added advantage where employed in earth moving machines in that the earth moving machines may be slowed down by using the hydrostatic motor or motors as a brake, since, when braking the wheels by using the engine of such a machine, the wheels act on the internal combustion engine via the hydrostatic driving arrangements.

A further advantageous feature of the drive arrangement of this invention is achieved in earth moving machines in which the internal combustion engine is mounted on an earth moving machine so that its fan is directed forwards and its hydraulic pump is directed to the rear. Such configuration allows ready access for servicing purposes, that is to say, ready access to both the hydraulic pump and also to the motors.

It is furthermore preferred and convenient in earth moving machines employing a drive arrangement according to the invention that the gear box consists of multi-speed epicyclic gearing for purposes of compactness and in which the epicyclic gearing preferably has three speeds with change in speed being achieved preferably by plate clutches.

THE DRAWINGS

A working embodiment of the invention will now be described with reference to the accompanying drawings and in which drawings.

DETAILED DESCRIPTION OF A WORKING EMBODIMENT OF THE INVENTION

Figure 1:
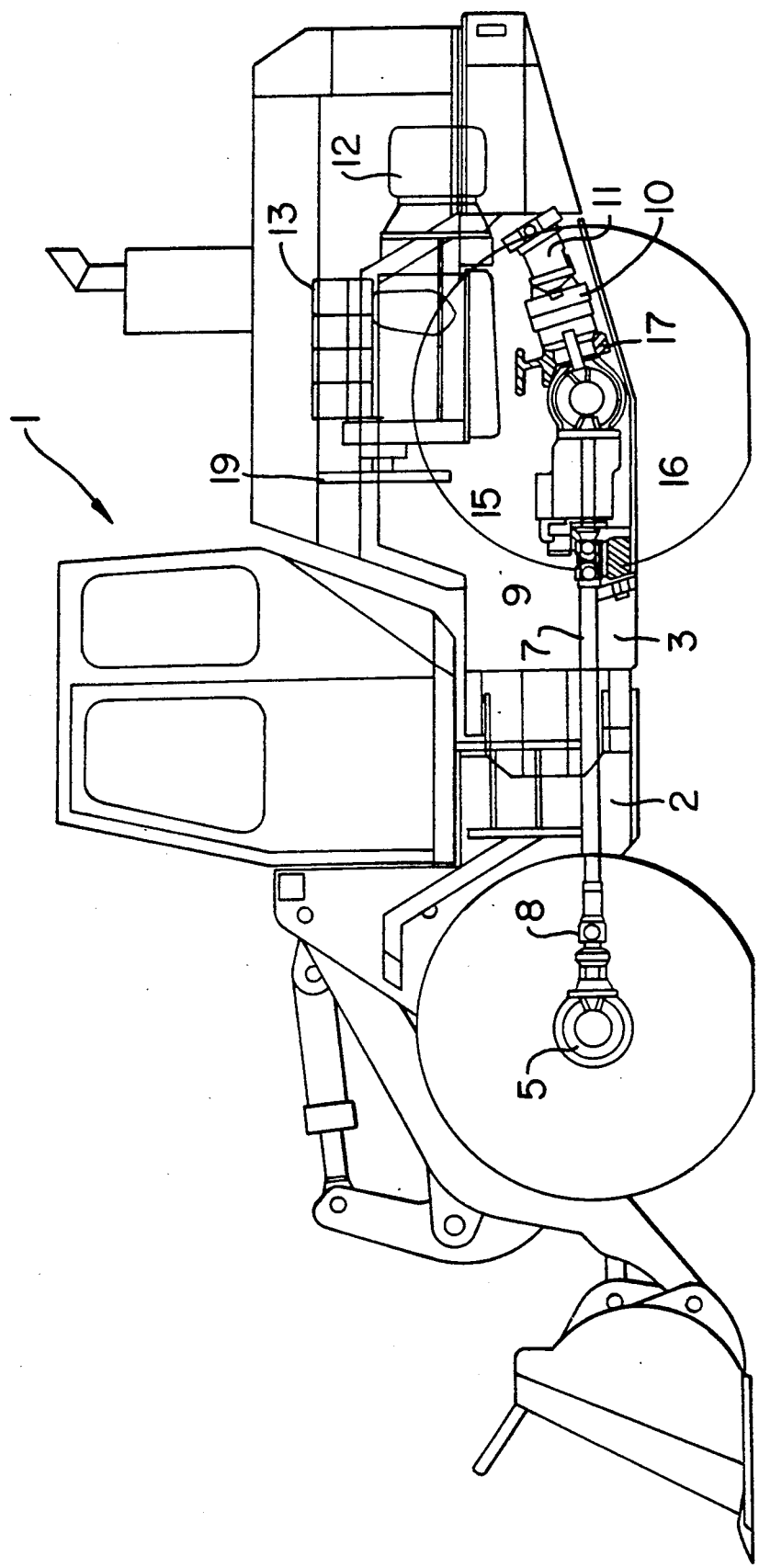
FIG. 1 is a diagrammatic elevational view, partially in section, of a wheel loader employing a drive arrangement according to the invention and illustrating the differentials, the swash plate motor flange-mounted on the rear differential, and the epicycle gearing flange-mounted on the swash plate motor.

Referring to FIG. 1, the wheel loader 1 illustrates that it is basically of conventional design and includes a front chassis part 2 and a rear chassis part 3, which are connected together by a conventional center joint which is only identified by its center line 4. The steering system, the loader shovel with its drive means and the arrangement and bearings for the axles are of conventional design and are thus not further described.

The shafts driving the four wheels are for their part driven via the front differential 5 and the rear differential 6. The two differentials 5 and 6 are connected by the universal joint shaft 7 with the universal joints 8 and 9, respectively.

The rear to which the rear wheel axle is connected in the conventional manner differential 6 has the epicyclic gearing 10 located in gear box 10' flange-mounted thereon so that it projects to the rear and a hydrostatic motor in the form of a swash plate motor 11, disposed as an axial piston motor, is flange-mounted on the gear box 10' containing epicyclic gearing 10 providing a rearward continuation thereof. The swash plate motor 11 is connected by hydraulic hose, not shown, with the pump 12, which is driven in a known manner by the diesel engine 13.

The center line of the epicycle gearing 10 and of the swash plate motor 11 flange-mounted thereon extends at an acute angle to the universal joint shaft 7 so as to slope upwards, thus providing greater ground clearance behind the rear axle.

Another hydrostatic motor in the form of a swash plate motor 15 is flange-mounted on the front side of the differential 6 of the rear wheel axle and the shaft 16 of this motor constitutes a part of the universal joint shaft 7.

The rear axle is in the form of a fully floating axle, which is only indicated by the support member 17.

A diesel engine 13 is mounted so that its fan 19 is directed forwards and a pump 12 is flange-mounted on engine 13 and directed towards the rear. Due to the manner in which they are mounted, all pumps and driving units are readily accessible for servicing and repairs.

Figure 2:
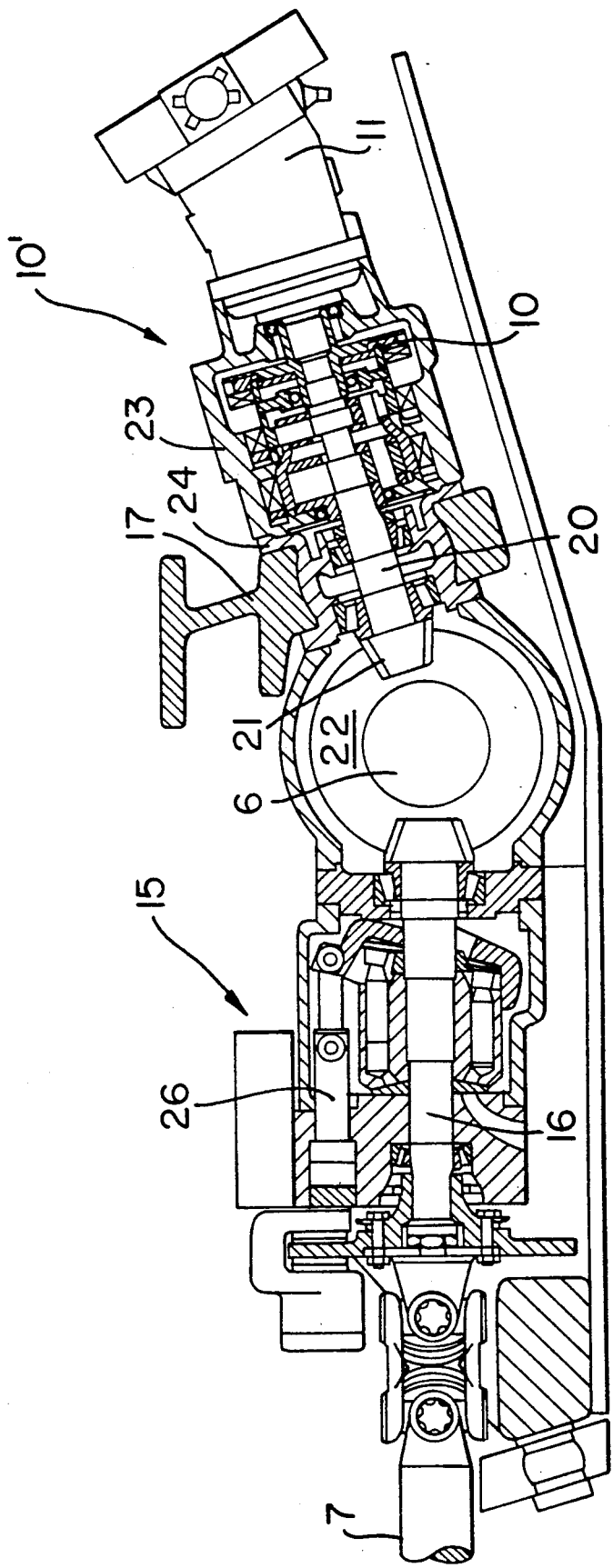
FIG. 2 is a longitudinal partial sectional view on a larger scale of the rear differential shown in FIG. 1 with the swash plate motor flange-mounted thereon, and the epicyclic gearing associated with the swash plate motor.
Figure 3:
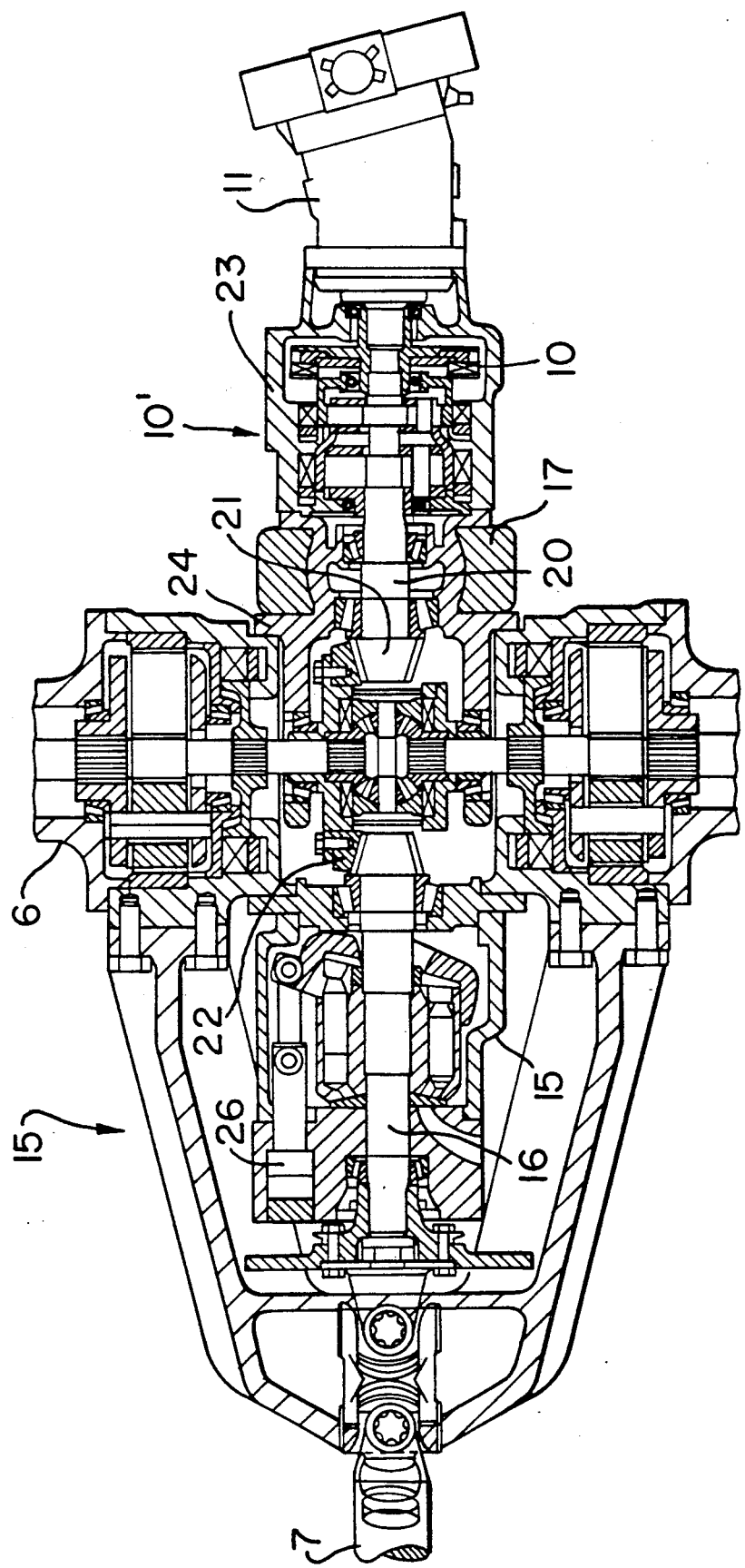
FIG. 3 is a plan view partially in section taken through the drive arrangement shown in FIG. 2.

FIGS. 2, and 3 show on a larger scale the differential 6 on the rear wheel axle with the flange-mounted swash plate motor 15 disposed thereon on the front side of the differential and with the flange-mounted epicyclic gearing 10 having the swash plate motor 11 flange-mounted on it. As may be seen from FIGS. 2 and 3, the central drive output shaft 20 of the epicyclic gearing 10 bears a bevel wheel 21, which is in mesh with the crown wheel 22 of the differential 6. The housing 23 of the epicyclic gearing 10 is not directly flange-mounted on the housing of the differential 6 but rather on an intermediate housing 24, which constitutes a part of the fully floating axle.

The first part 16 of the universal joint shaft 7 forms the axle of the swash plate motor 15. The adjustment of the swash plate for controlling power is performed in a conventional manner using the hydraulic cylinder 26.

All the other elements of the design in the driving arrangement will be clearly seen from the drawing and thus are not in need of any further explanation.

In a basic form of the driving arrangement of the invention, the planetary gear box 10, of epicyclic gearing is not present and the swash plate motor 11 is flange-mounted directly on rear differential 6. In a modification of such drive arrangement in accordance with the invention, a second swash plate motor 15 is flange-mounted on the front end of differential 6, if desired.

What is claimed is:

1. In an improved drive arrangement for an earth moving machine having front and rear wheel driving axles provided with differentials having universal joints which are connected together by a universal joint shaft, a brake system, a steering system, an internal combustion engine having a fluid power pump which is driven by said engine, the improvement comprising:
   a controlled hydrostatic motor connected to said universal joint shaft.
   said pump connected to said controlled hydrostatic motor,
   a drive shaft connected between said pump and said universal joint shaft.

2. A drive arrangement according to claim 1 wherein the hydrostatic motor is a swash plate motor.

3. A drive arrangement according to claim 2 wherein the swash plate motor acts as a reserve pump.

4. A drive arrangement according to claim 2 wherein the swash plate motor projects towards the rear of the earth moving machine, being flange-mounted on the housing of the differential of the rear wheel axle and drives a crown wheel in said differential.

5. A drive arrangement according to claim 4 wherein the swash plate motor acts as a reserve pump.

6. A drive arrangement according to claim 1 wherein the hydrostatic motor is flange-mounted on the differential of the rear axle.

7. A drive arrangement according to claim 1 wherein the hydrostatic motor acts as a reserve pump.

8. A drive arrangement according to claim 1 wherein the hydrostatic motor projects towards the rear of the earth moving machine, being flange-mounted on the housing of the differential of the rear wheel axle and drives a crown wheel in said differential.

9. A drive arrangement according to claim 8 wherein the hydrostatic motor acts as a reserve pump.

10. A drive arrangement according to claim 1 including a housing enclosing the differential of the rear wheel axle and a gear box flange-mounted on said housing projecting towards the rear of the earth moving machine, said gear box having an output shaft connected through a bevel wheel with a crown wheel of said differential and driving said crown wheel, and the hydrostatic motor is flange-mounted on a rear end of said gear box and drives said output shaft of said gear box.

11. A drive arrangement according to claim 10 wherein the gear box includes multi-speed epicyclic gearing.

12. A drive arrangement according to claim 11 wherein the hydrostatic motor is a swash plate motor.

13. A drive arrangement according to claim 10 wherein the hydrostatic motor is a swash plate motor.

14. A drive arrangement according to claim 1 wherein the internal combustion engine is mounted in the earth moving machine with the fan of said engine facing towards the front of said machine and the fluid power pump facing towards the rear of said machine.

* * * * *

UNITED STATES PATENT AND TRADEMARK OFFICE
CERTIFICATE OF CORRECTION

PATENT NO.   : 5,188,193
DATED        : February 23, 1993
INVENTOR(S)  : Klaus Schroder It is certified that error appears in the above-identified patent and that said Letters Patent is hereby corrected as shown below:

Column 3, lines 67 and 68, "The rear to which the rear wheel axle is connected in the conventional manner differential 6" should read --The rear differential 6 to which the rear wheel axle is connected in the conventional manner has the epicyclic--;

Column 4, line 64, "universal joint shaft." should read --universal joint shaft,--.

Signed and Sealed this

Eleventh Day of January, 1994

Attest:

BRUCE LEHMAN

*Attesting Officer*  *Commissioner of Patents and Trademarks*